(12) United States Patent
Suzuki et al.

(10) Patent No.: US 6,533,107 B2
(45) Date of Patent: Mar. 18, 2003

(54) SILENT CHAIN POWER TRANSMITTING APPARATUS

(75) Inventors: Kenshi Suzuki, Osaka (JP); Masatoshi Sonoda, Osaka (JP); Hiroshi Horie, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/964,162

(22) Filed: Sep. 26, 2001

(65) Prior Publication Data

US 2002/0045504 A1 Apr. 18, 2002

(30) Foreign Application Priority Data

Sep. 26, 2000 (JP) ........................................ 2000-292781

(51) Int. Cl.$^7$ ............................................... B65G 23/06
(52) U.S. Cl. ........................ 198/834; 198/851; 474/156; 474/157; 474/212
(58) Field of Search ................................. 198/834, 850, 198/851; 474/155–157, 212, 213

(56) References Cited

U.S. PATENT DOCUMENTS

| | | | | |
|---|---|---|---|---|
| 5,267,910 A | * | 12/1993 | Maruyama et al. | ......... 474/212 |
| 5,628,702 A | * | 5/1997 | Kotera | ......... 474/213 |
| 6,077,181 A | * | 6/2000 | Kanehira et al. | ........... 474/212 |
| 6,112,510 A | * | 9/2000 | Ichikawa et al. | ................. 59/5 |
| 6,155,944 A | * | 12/2000 | Matsuda | ..................... 474/157 |
| 6,325,735 B1 | * | 12/2001 | Kanehira et al. | ........... 474/212 |
| 6,334,828 B1 | * | 1/2002 | Suzuki | ....................... 474/212 |
| 6,461,263 B2 | * | 10/2002 | Suzuki et al. | ................ 474/213 |

FOREIGN PATENT DOCUMENTS

| | | | | |
|---|---|---|---|---|
| DE | 19929823 A1 | * | 1/2000 | ........... F16G/13/04 |
| EP | 0 927 836 A1 | | 7/1999 | |
| EP | 0 933 557 A1 | | 8/1999 | |
| EP | 0 982 516 A1 | | 3/2000 | |

* cited by examiner

Primary Examiner—Christopher D. Ellis
Assistant Examiner—Mark A. Deuble
(74) Attorney, Agent, or Firm—Howson & Howson (57) ABSTRACT

A silent chain power transmitting apparatus includes a silent chain and two or more sprockets with different number of teeth, wherein the sprockets each have a tooth form formed by hobbing with a hob cutter having teeth profiled similarly with the profile of a series of trapezoidal teeth formed by the inside flanks of longitudinally overlapping link plates of the silent chain so as to cut the periphery of a cylindrical workpiece with an amount of addendum modification set in such a manner that an engagement height of the inside flank at the onset of the meshing engagement between the silent chain and the sprocket is in equal to the distance between the sprocket center and the connecting pin centers when the silent chain is wrapped around and seated on the sprocket. The outside flanks of the silent chain have a first portion profiled by an envelope that is tangent to every one of a group of tooth forms of the sprockets when the silent chain is wrapped around the sprockets with different numbers of teeth.

4 Claims, 10 Drawing Sheets

SILENT CHAIN POWER TRANSMITTING APPARATUS

BACKGROUND OF THE INVENTION

The present invention relates to a silent chain power transmitting apparatus for transmitting power between sprockets with different numbers of teeth as achieved when driving camshafts or a balancer shaft from a crankshaft of a four-stroke engine.

Figure 10:
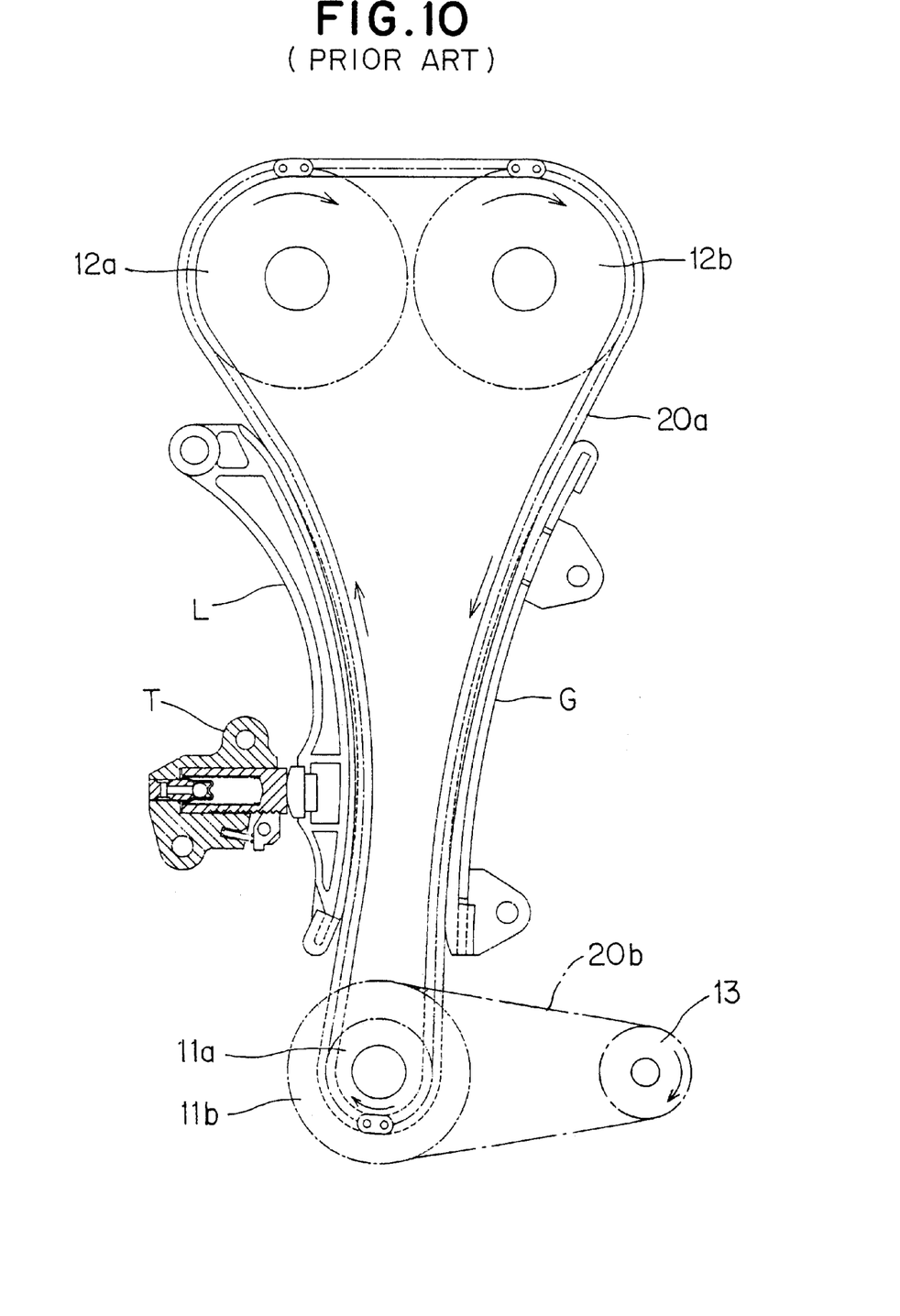
FIG. 10 schematically illustrates the general construction of a conventional silent chain power transmitting apparatus.

In a four-stroke engine shown in FIG. 10 hereof, a silent chain power transmitting apparatus used for driving intake valves, exhaust valves and a balancer from a crankshaft has a valve driving crankshaft sprocket 11a, an intake valve driving camshaft sprocket 12a, an exhaust valve driving camshaft sprocket 12b, a balancer driving crankshaft sprocket 11b, a balancer shaft sprocket 13, a camshaft driving silent chain 20a, a balancer shaft driving silent chain 20b, a tensioner device composed of a tensioner lever L and a tensioner T cooperative to apply an appropriate tension on the silent chain 20, and a chain guide G for guiding the silent chain 20a against oscillation.

The intake and exhaust valves are designed to complete a single cycle of operation while the crankshaft makes two revolutions. Thus, the number of teeth of the camshaft sprockets 12a, 12b is twice the number of teeth of the camshaft driving crankshaft sprocket 11a. The sprockets 11a. 12a, 12B and the silent chain 20a form a speed decreasing power transmitting mechanism.

The balancer is designed to cancel out high-order unbalance by completing two revolutions while the crankshaft makes a single turn or revolution. To this end, the number of teeth of the balancer shaft sprocket 13 is half the number of teeth of the balancer driving crankshaft sprocket 11b. The sprockets 11b, 13 and the silent chain 20b form a speed increasing power transmitting mechanism.

The camshaft driving silent chain 20a and the balancer shaft driving silent chain 20b are substantially identical in construction, and though not shown in detail, they are constructed such that when the silent chain 20a, 20b is stretched straight under tension, respective central swelled portions of the inside flanks of a pair of link teeth of each link plate project outward from rectilinear outside flanks of the link teeth of the preceding link plate. With this construction, when the link plates of the silent chain 20a, 20b start to mesh with teeth of the sprocket 11a, 11b, 12a, 12b, 13, the inside flanks of the link plates come into contact with the sprocket teeth. This engagement is taken over by subsequent engagement of the outside flanks with the sprocket teeth, as achieved when the link plates of the silent chain are wrapped around the sprocket. When the link plates are placed in full meshing engagement with the sprocket teeth, the outside flanks are completely seated on the sprocket teeth. By way of the meshing engagement between the outside flanks of the link plates and the sprocket teeth, the silent chain transmits power between the crankshaft and the camshafts or between the crankshaft and the balancer shaft.

The crankshaft sprockets 11a, 11b, the camshaft sprockets 12a, 12b and the balancer shaft sprocket 13 are formed by a sprocket tooth hobbing process. In the hobbing process, a hob cutter with teeth profiled similarly with the profile of a series of trapezoidal teeth formed by the rectilinear outside flanks of the longitudinally overlapping link plates described previously is used to cut the periphery of a cylindrical workpiece with an amount of addendum modification set in such a manner that the silent chain 20a, 20b, as it is wrapped around the sprocket, forms an equilateral polygon with one side equal in length to a pitch of the silent chain. Thus, an involute tooth form is produced.

Operation of the conventional silent chain power transmitting apparatus of the foregoing construction will be described in conjunction with one of the sprockets 11a, 11b, 12a, 12b and 13 with different numbers of teeth.

In the conventional silent chain power transmitting apparatus, the silent chain 20a, 20b, as it is wrapped around the sprocket, forms an equilateral polygon while the outside flanks of each pair of link teeth are being seated on tooth flanks or surfaces of alternate sprocket teeth. In this instance, since the central swelled portion of the inside flanks of one link plate projects outward from the rectilinear outside flank of the preceding link plate, the inside flank of the link plate come into contact with the sprocket tooth flank and temporarily raises or lifts up the silent chain before the outside flank is seated on the same sprocket tooth flank Such temporary chain lifting seeks to suppress the equilateral polygonal chain motion, generally called "chordal action" of the silent chain, which involves up and down movement or oscillation of the chain in a radial direction of the sprocket when the chain starts to mesh with the sprocket.

However, due to a great difference in the number of teeth between the crankshaft sprocket 11a and the camshaft sprockets 12a, 12b, or between the crankshaft sprocket 11b and the balancer shaft sprocket 13, the angles of rotation of the sprockets 11a, 11b; 12a, 12b and 13, which cause the silent chain to advance by one chain pitch, are different from one another. Consequently, the amplitudes of the chordal actions occurring at the respective sprockets vary to a considerable extent.

In the case where a silent chain having link teeth formed with centrally swelled inside flanks is used, the silent chain approaching a sprocket is lifted up by a constant amount of distance. Accordingly, the chordal action with respect to a selected one of the sprockets 11a, 11b, 12a, 12b and 13 can be suppressed. However, it is extremely difficult to suppress all of the chordal actions associated with these sprockets 11a, 11b, 12a, 12b and 13.

Furthermore, even when the chordal action occurring with respect to one of the 11a, 11b, 12a, 12b and 13 is suppressed, it is not considered from the viewpoint of the silent chain power transmitting apparatus as a whole that vibration and noises resulting from the chordal action are effectively reduced. Rather, when the central swelled portions of the inside flanks impinge against the sprocket tooth flanks, a beating motion of the silent chain occurs, producing additional sorts of vibration and noise and fluctuating the chain tension.

SUMMARY OF THE INVENTION

It is therefore an object of the present invention to provide a silent chain power transmitting apparatus for transmitting power between sprockets with different numbers of teeth, as achieved when camshafts or a balancer shaft is driven by a crankshaft of a four-stroke engine via a silent chain, in which the chordal action of the silent chain is completely suppressed with respect to all of the sprockets to thereby reduce vibration and noises caused the chordal action, and the changes in the chain tension is suppressed to thereby improve the driving performance and the durability of the silent chain power transmitting apparatus.

To achieve the foregoing object, according to the present invention, there is provided a silent chain power transmitting apparatus comprising; an endless silent chain composed of a multiplicity of link plates interleaved and articulately connected together by connecting pins, each link plate having a pair of generally V-shaped link teeth and a pair of pin holes for fitting the connecting pins, the V-shaped link teeth having inside and outside flanks; and at least two sprockets spaced from each other and having different numbers of teeth for mesh with the V-shaped link teeth of the link plates. When the silent chain starts to mesh with each of the sprockets, the inside flank of one link plate comes in contact with a tooth of the sprocket, and as the silent chain is wrapped around and subsequently placed in full meshing with the sprocket, the outside flank of the preceding link plate comes in contact with and subsequently becomes completely seated on the same teeth of the sprocket, thereby ensuring that the silent chain transmits power between the sprockets. The sprockets each have a tooth form formed by hobbing with a hob cutter having teeth profiled similarly with the profile of a series of trapezoidal teeth formed by the inside flanks of the longitudinally overlapping link plates described previously to cut the periphery of a cylindrical workpiece with an amount of addendum modification set in such a manner that an engagement height of the inside flank at the onset of the meshing engagement between the silent chain and the sprocket is in equal to a center distance between the center of the sprocket and the center of each connecting pin when the silent chain is wrapped around and seated on the sprocket. The outside flanks of the silent chain have a first portion profiled by an envelope that is tangent to every one of a group of tooth forms of the sprockets when the silent chain is wrapped around the sprockets with different numbers of teeth.

In one preferred form of the present invention, the first outer flank portion of each link tooth is disposed remotely from the tip of the link tooth, and the outside flanks further include a rectilinearly profiled second portion disposed adjacent to the tip end of each link tooth. The inside flanks of each link tooth have a rectilinear profile, and the outside flank of one link plate is retracted inward from the rectilinearly linearly profiled inside flank of the succeeding link plate.

The outside flanks may be arcuately concaved at the junction between the first outside flank portion and the rectilinearly profiled second portion.

In operation of the silent chain power transmission apparatus, the inside flank of one link plate comes in contact with a tooth of the sprocket at the onset of the meshing engagement between the silent chain and the sprocket. Then, as the silent chain is wrapped around and subsequently placed in full meshing with the sprocket, the outside flank of the preceding link plate comes into contact with and subsequently becomes completely seated on the same sprocket tooth, thereby ensuring that the silent chain transmits power between the sprockets.

By virtue of the two-stage or time-phased engagement, a meshing sound generated during meshing engagement between the silent chain and the sprocket is born separately by the inside flank and the outside flank. It is also possible to suppress stress concentration, which may occur at a crotch portion between the V-shaped link teeth when the silent chain is wrapped around the sprocket.

In the silent chain power transmitting apparatus of the present invention, the sprockets with different numbers of teeth have a tooth form formed by hobbing with a hob cutter having teeth profiled similarly with the profile of a series of trapezoidal teeth formed by the inside flanks of the longitudinally overlapping link plates described previously to cut the periphery of a cylindrical workpiece with an amount of addendum modification set in such a manner that an engagement height of the inside flank at the onset of the meshing engagement between the silent chain and the sprocket is in equal to a center distance between the center of the sprocket and the center of each connecting pin when the silent chain is wrapped around the sprocket. By thus profiling the sprocket teeth, the inside flanks of the link plates approaching the sprocket in the tangential direction always have an engagement height which is correspondent with the apex of an equilateral polygonal chain motion. This arrangement ensures that the silent chain and the sprocket assume a rack-and-pinion mechanism and can perform a smooth meshing operation free of fluctuations of the meshing speed. Furthermore, the equilateral polygonal chain motion, i.e., the chordal action, which occurs in the conventional silent chain as it approaches the sprocket, can be avoided.

In addition, the outside flanks of the silent chain have a tooth form profiled by an envelope that is tangent to every one of the tooth forms of the sprockets when the silent chain is wrapped around the sprocket By thus profiling the sprocket tooth form, the center distance between the sprocket center and the connecting pin centers of those link plates which are seated on the sprocket teeth along the outside flanks becomes equal to the engagement height of the link plate approaching the sprocket, regardless of the numbers of teeth of individual sprockets. This ensures that the silent chain becomes seated on the sprocket without producing a beating motion.

It will be appreciated form the foregoing description that with respect to any one of the sprockets with different numbers of teeth, from the start of meshing engagement between the silent chain and the sprocket to the end of seating of the silent chain on the sprocket, the distance between the center of the sprocket and the chain pitch line of the silent chain approaching the sprocket in the tangential direction is kept always constant. This ensures that both the chordal action of the chain and the beating motion of the chain can be suppressed.

The silent chain power transmitting apparatus of the present invention is also possible to suppress both the chordal chain action and the beating chain motion when used with two or more sprockets with the same number of teeth.

The term "at the onset of the meshing engagement" used herein represents a time point at which the inside flank of one link plate of the silent chain starts to contact a tooth of the sprocket from a tangential direction of the sprocket. The term "when the silent chain is wrapped around the sprocket" used herein represents a time point at which after the onset of the meshing engagement, the inside flank has loft the tooth of the sprocket, and the outside flank or the preceding link plate of the silent chain is seated on the same sprocket tooth while the silent chain is wrapped around the sprocket.

The term "engagement height of the inside flank" used herein represents a distance between a chain pitch line of one link plate approaching the sprocket at the onset of the meshing engagement and the center of the sprocket. The term "chain pitch line" used herein represents a line that interconnects the centers of connecting pins inserted through one link plate.

The term "seated height of the outside flank" used herein represents a distance between the chain pitch line and the center of the sprocket when the chain is wrapped around the sprocket in a manner to assume an equilateral polygon.

The term "sprockets having different numbers of teeth" is used herein in a comprehensive sense, i.e., to broadly refer to two or more sprockets each having a different number of teeth. There are no limitations about the numbers of teeth of the sprocket used provided that the sprockets can mesh with a silent chain used in combination therewith. To ensure that the outside flanks of the silent chains are stably seated on the sprocket teeth, the sprockets preferably have more than eighteen (18) teeth.

The "link plates" connected together to form an endless silent chain all have an identical surface profile with respect to each of the inside flanks and the outside flanks. The distance between the inside flank of one link plate and the corresponding inside flank of the preceding link plate is equal to a chain pitch P which is defined as a center distance between the pair of the connecting pins inserted through one link plate.

At the onset of the meshing engagement, the silent chain the sprocket assume a well known meshing state established between a rack and a pinion. Accordingly, the "inside flanks" of the generally V-shaped link teeth preferably have a generally rectilinear profile that can form a series of trapezoidal teeth of a rack.

The "outside flanks" of the generally V-shaped link teeth have, at least at a part thereof, a shape profiled by an envelope that is tangent to every one of the tooth forms of the sprockets when the silent chain is wrapped around the sprocket. The shape of the outside flanks is independent from the overall shape of the V-shaped link teeth. The outside flanks preferably have a rectilinear profile at a portion adjacent to a tip end of the corresponding V-shaped link tooth, the rectilinear profile having the same pressure angle as the inside flanks and being tangent to the tooth form of one sprocket having a minimum number of teeth. By thus profiling the outside flanks, it is possible to improve the durability of the V-shaped link teeth When the silent chain is stretched substantially straight under tension, the outside flanks of one link plates, which are profiled by the envelope that is tangent to every one of the tooth forms of the sprocket, are retracted from the substantially rectilinearly profiled inside flanks of the adjacent link plates.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

A silent chain power transmitting apparatus according to the present invention comprises, in the same way as the conventional apparatus shown in FIG. 10, a speed decreasing power transmitting mechanism composed of a valve driving crankshaft sprocket 11a, an intake valve driving camshaft sprocket 12a, an exhaust valve driving camshaft sprocket 12a and a camshaft driving silent chain 20a, and a speed increasing power transmitting mechanism composed of a balancer shaft driving sprocket 11b, a balancer shaft sprocket 13 and a balancer shaft driving silent chain 20b. The speed decreasing power transmitting mechanism is designed such that intake and exhaust valves complete a single cycle of operation while the crankshaft makes two revolutions. The speed increasing power transmitting mechanism is designed such that the balancer shaft completes two revolutions while the crankshaft makes a single turn or revolution. The camshaft driving silent chain 20a and the balancer shaft driving silent chain 20b are identical in shape and construction, so that these silent chains 20a, 20b will be denoted by 20.

Figure 1:
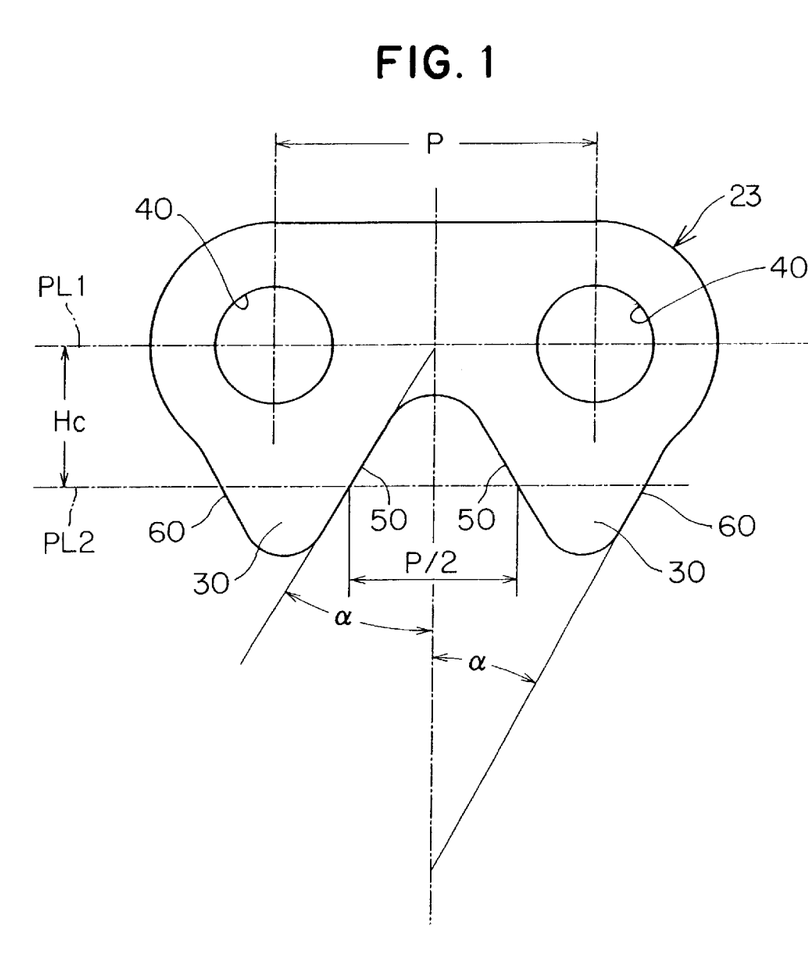
FIG. 1 is a schematic illustration of a link plate of a silent chain employed in a silent chain power transmitting apparatus according to the present invention.
Figure 2:
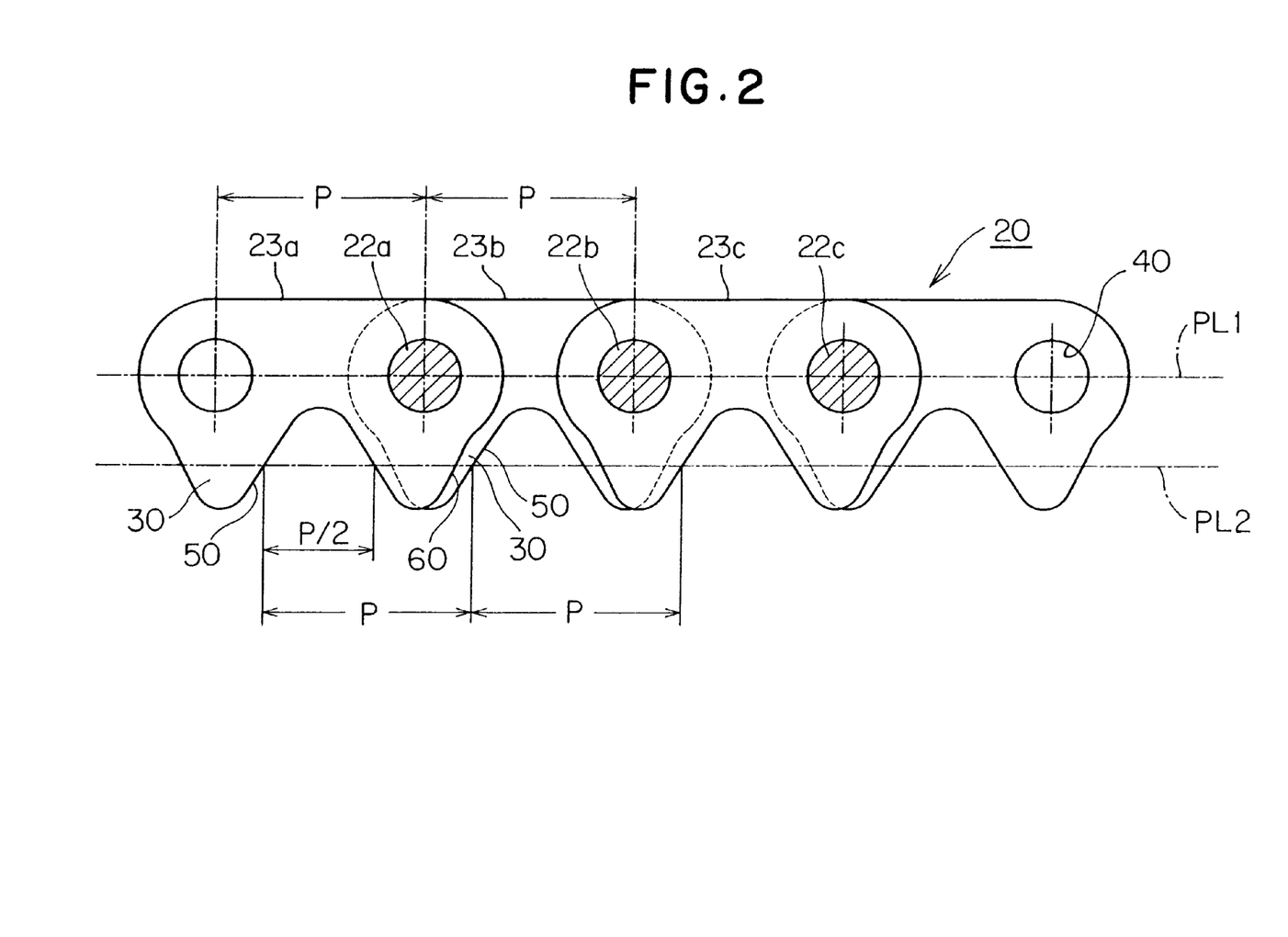
FIG. 2 schematically illustrates the general arrangement of the silent chain.

As shown in FIG. 2, the silent chain 20 comprises a plurality of link plates 23a, 23b, 23c interleaved and articulately connected together in an endless fashion by means of connecting pins 22a, 22b, 22c. The silent chain 20 is trained around two or more sprockets 10 (one being shown in FIGS. 8 and 9) spaced from one another. As shown in FIG. 1, each of the link plates (collectively designated by 23) has a pair of generally V-shaped link teeth 30, 30 and a pair of pin holes 40, 40 for fitting the connecting pins 23a–23c (FIG. 2). The V-shaped link tooth 30 have inside and outside flanks 50 and 60.

When the silent chain 20 shown in FIG. 2 starts to mesh with each of the spaced sprockets, the inside flank 50 of one link plate (23b, for example) comes in contact with a tooth of the sprocket. As the silent chain is trained around the sprocket and subsequently placed in full mesh with the sprocket, the outside lank of the preceding link plate 23a comes in contact with and subsequently becomes completely seated on the same sprocket tooth, thereby ensuring that the silent chain 20 transmits power between the spaced sprockets.

As shown in FIG. 1, the inside flanks 50 of the V-shaped link teeth 30 have a rectilinear profile formed under the conditions that the distance between a chain pitch line PL1 and an inside flank pitch line PL2 is Hc and the pressure angle is $\beta$.

As previously specified, the term "chain pitch line" represents a line that interconnects the centers of the connecting pins (correctively designated, for convenience, by 22) inserted through the pin holes 40 of one link plate. The term "inside flank pitch line" used herein represents a line passing parallel to the chain pitch line over two inside flanks 50, 50 the link plate 23 at points where a distance between those two points becomes ½ of a chain pitch P, which is equal to the distance between the two connecting pins 22 of the link plate 23.

The outside flanks 60 of the V-shaped link teeth 30 have, at least at a part thereof, a shape or configuration profiled by an envelope that is tangent to every one or a group of different tooth forms of the sprockets (see the sprockets 11a, 11b, 12a, 12b, 13 shown in FIG. 10) when the silent chain 20 is wrapped around the sprocket. Stated more specifically, the outside flanks have a first portion 60a profiled by an envelope that is tangent to any one of a groups of tooth form curves of sprockets with different numbers of teeth, which can be described on a link plate so arranged to assume the distance between the center of each sprocket and the chan pitch line when the silent chain is wrapped around the sprocket in a polygonal fashion.

The envelope used to profile the outside flank portion 60a is obtained in a manner as described below.

Figure 3:
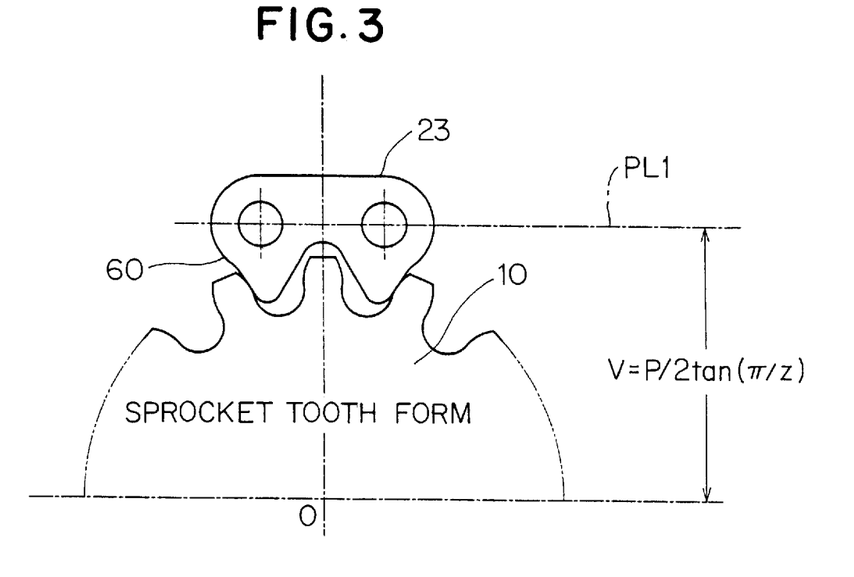
FIG. 3 schematically illustrates how outside flanks of the link plate are formed.

As can be seen from FIG. 3, the number of teeth z of a sprocket 10 is the distance V between the center O of the sprocket 10 and the chain pitch line PL1 when the silent chain 20 (FIG. 2) is wrapped around the sprocket 10 have a geometrical relationship expressed by $$V = P/2 \, \tan(\Pi/z)$$

where P is the chain pitch as defined above.

Figure 4:
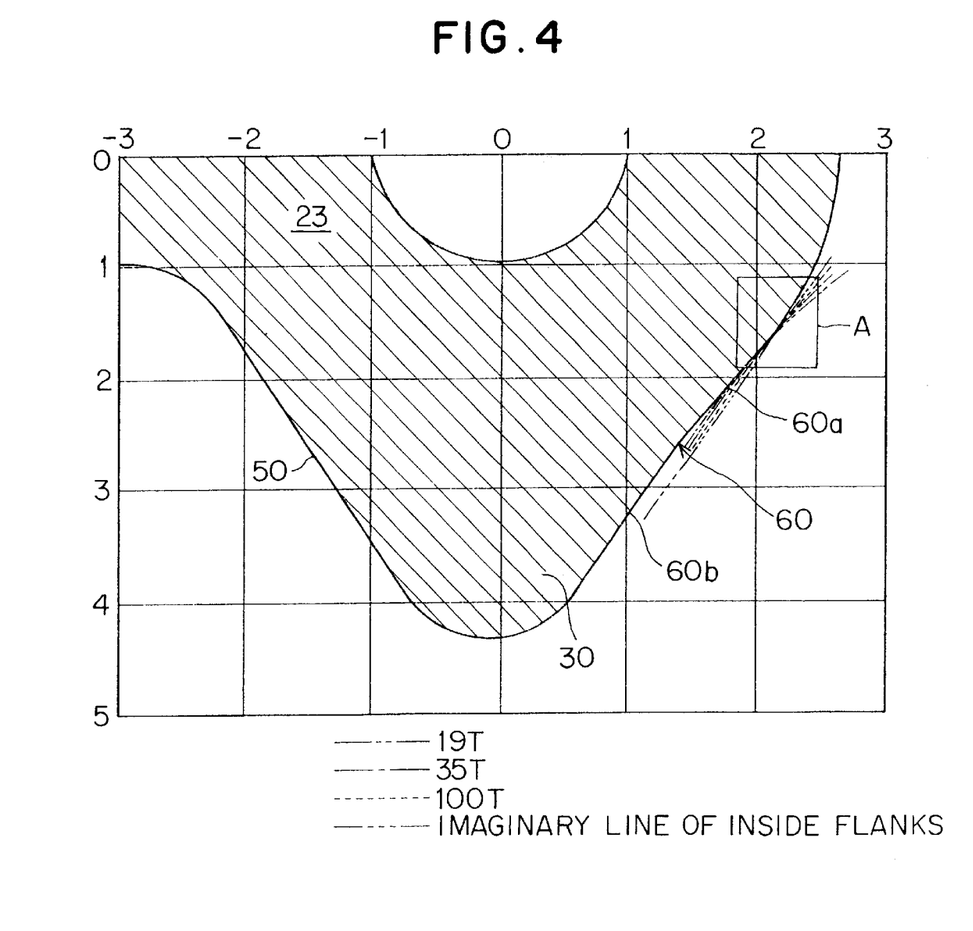
FIG. 4 shows a profile of the outside flanks formed by an envelope.
Figure 5:
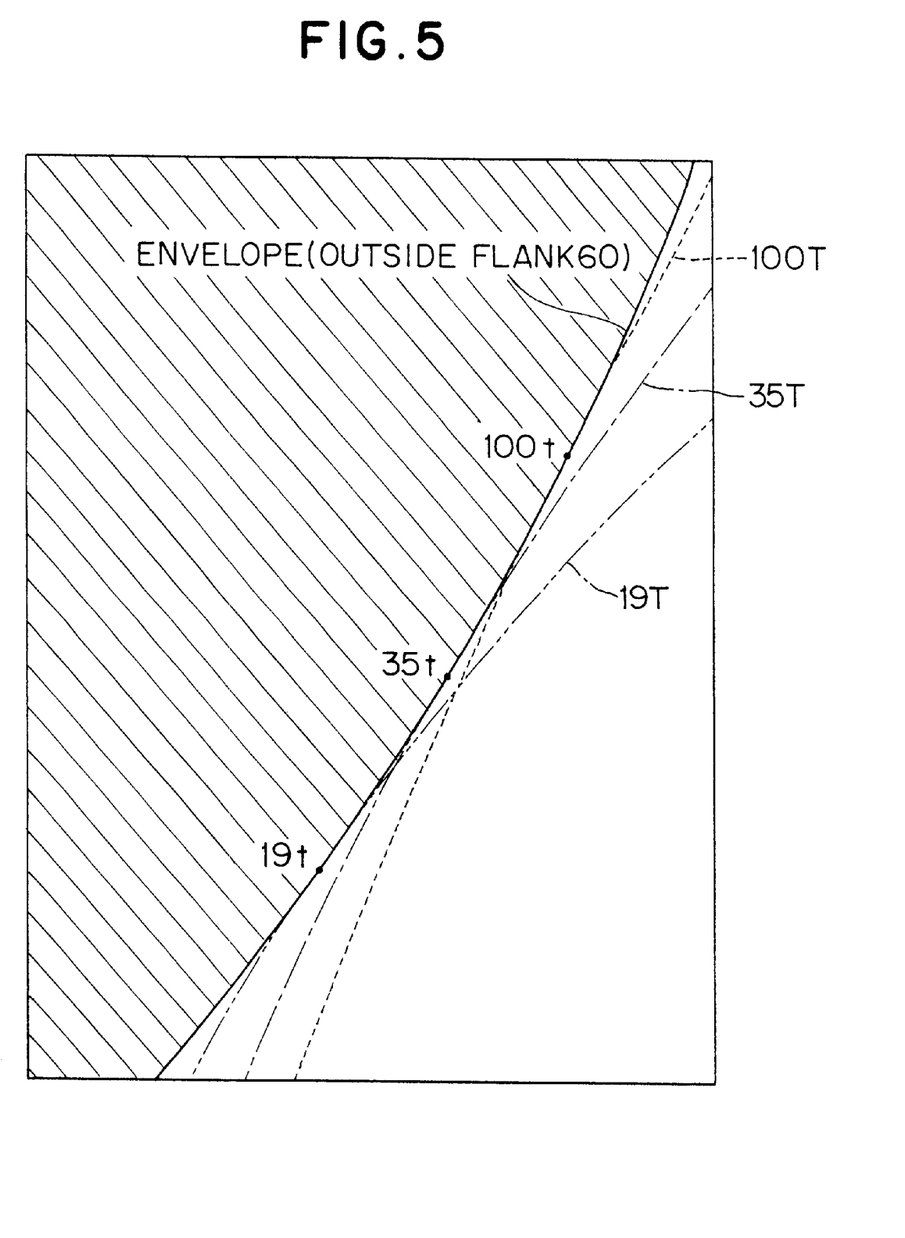
FIG. 5 is an enlarged view of a part shown in a square A of FIG. 4.

A link plate blank (at least having outer flanks left unfinished) is arranged to assume those positions which are determined by the respective distances V obtained, based on the expression, with respect to the sprockets 11a, 11b, 12a, 12b and 13 (see FIG. 10) having different numbers of teeth. At the respective positions, the sprocket tooth form curves are described on the link plate blank, and an envelope that is tangent to all of the sprocket tooth form curves is determined, as shown in FIGS. 4 and 5. The envelope thus obtained is used to form a profile of at least the portions 60a of the outer flanks 60 of a finished link plate 23.

FIG. 5 is an enlarged view of a part in a square shown in FIG. 4. In FIGS. 4 and 5, reference characters 19T, 35T and 100T denote the sprocket tooth form curves, and the numerals accompanied by the letter "T" represent the numbers of teeth of the sprockets. Solid dots 19t, 35t and 100t shown in FIG. 5 represent contact points between the respective tooth form curves of the sprockets with different numbers of teeth 19T, 35T and 100T and the envelope.

As shown in FIG. 5, none of the sprocket tooth form curves 19T, 35T and 100T are retracted inward from another sprocket tooth form curve along the lengths thereof. This ensures that the envelope and the outside flank portions 60a profiled by the envelope are tangent to any one of a group of tooth form curves 19T, 35T, 100T of the sprockets 11a, 11b, 12a, 12b and 13 (see FIG. 10) with different numbers of teeth.

The outside flanks 60 of each link tooth 30 are partly narrowed or arcuately concaved so as to assume a distorted S-shape as shown in FIG. 4. Thus, when the silent chain 20 is stretched straight as shown in FIG. 2, the partly narrowed outside flank 60 of one link plate 23a is retracted inward from the inside flank 50 of the succeeding link plate 23b. This ensures that when the silent chain approaches the sprocket in the tangential direction, the outside flank 60 does not hinder smooth engagement between the inside flank 50 and the sprocket tooth.

In order to improve the durability of the V-shaped link teeth 30, the outside flank 60 has a rectilinearly profiled second portion 60b disposed adjacent to the tip of the link tooth 30, as shown in FIG. 4. The rectilinearly profiled portion 60b is adapted for engagement with the teeth of one sprocket having a minimum number of teeth and has the same pressure angle as the rectilinearly profiled inside flank 50.

The first outside flank portion 60a is disposed remotely from the tip of each link tooth 30, while the second outside flank portion 60b is disposed adjacent to the tip of each link tooth 30 as described above. The outside flanks 60 are narrowed or arcuately concaved at the junction between the first outside flank portion 60a and the second flank portion 60b.

In the silent chain 20, all of the link plates 23a, 23b, 23c have the same outside shape or contour as shown in FIG. 2. The inside flank 50 of a leading or a trailing link tooth 30 of one link plate 23a and the inside flank 50 of the corresponding link tooth 30 of the adjacent link plate 23b are spaced at a distance equal to the chain pitch P.

The description will be made next as to the sprockets employed in the silent chain power transmitting apparatus with reference to FIGS. 6 and 7.

Figure 6:
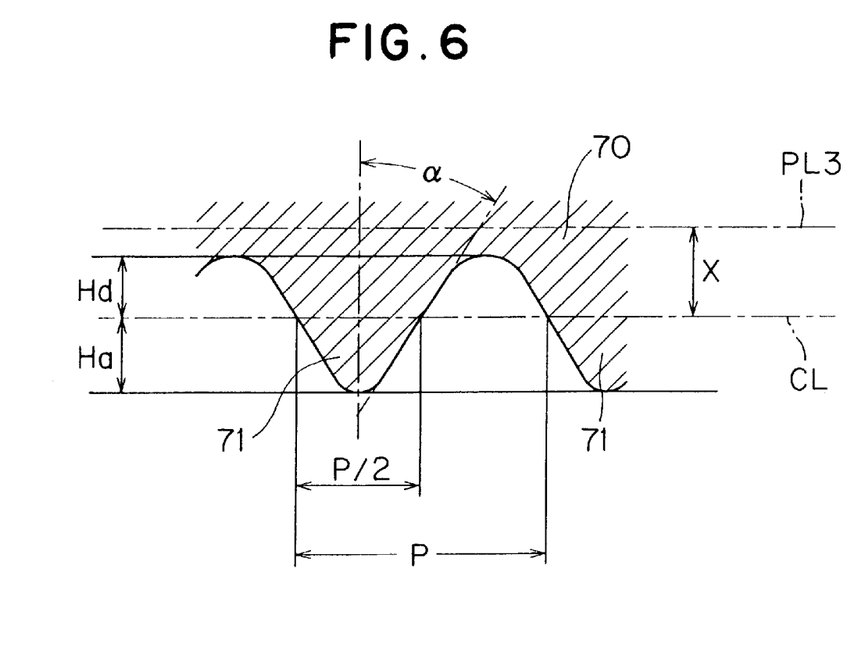
FIG. 6 is a schematic cross-sectional view of a hobbing cutter used in a sprocket tooth hobbing process according to the present invention.

FIG. 6 shows in cross section the profile of a hob cutter 70. The hub cutter 70 has teeth 71 profiled similarly with the profile of a series of trapezoidal teeth formed by the inside flanks 50 (FIG. 1) of the longitudinally overlapping link plates 20 (FIG. 1). The hub cutter 70 is used for forming or hobbing all of the sprockets 11a, 11b, 12a, 12b and 13 shown. in FIG. 10.

The hob cutter 70 has a pitch P, a pressure angle $\beta$, a deddendum Hd and an addendum Ha. The pitch P of the hub cutter 70 is equal to the chain pitch P. The pressure angle $\beta$ of the hub cutter is equal to the pressure angle $\beta$ of the inside flanks 50 (FIG. 1) of the link plate 23 (FIG. 1). The deddendum Hd is smaller than the distance from the inside flank pitch line PL2 to the bottom of the inside flanks 50 by at least the amplitude of equilateral polygonal chain motion occurring with respect to the sprocket having a minimum number of teeth. The addendum Ha is larger than the distance from inside flank pitch line PL2 to the tips of the link teeth 30 by at least the amplitude of the equilateral polygonal chain motion occurring with respect to the sprocket having a minimum number of teeth.

Figure 7:
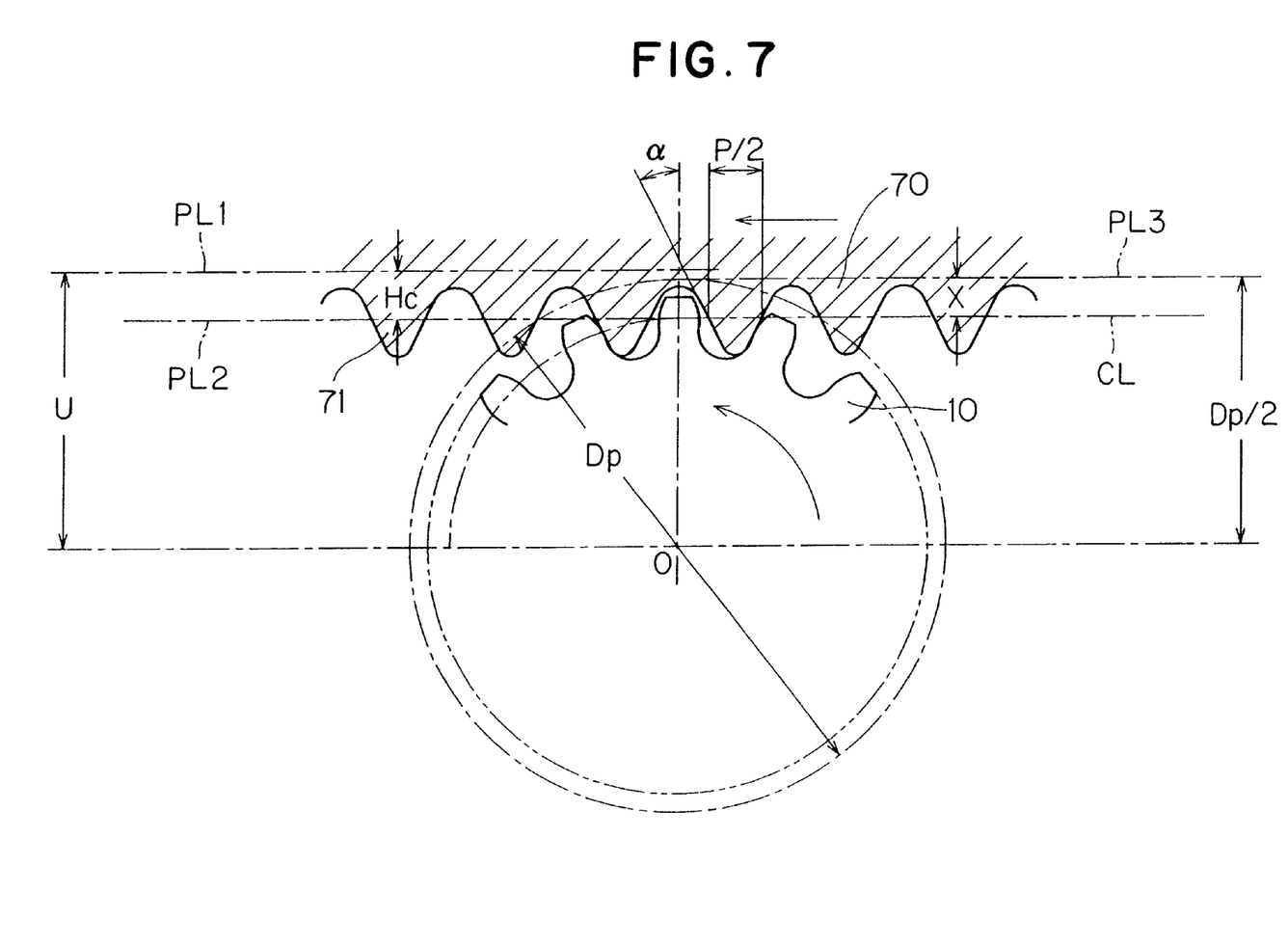
FIG. 7 is a schematic illustration of the sprocket tooth hobbing process in which teeth of a sprocket are formed.

FIG. 7 schematically illustrates the sprocket tooth hobbing process in which teeth of a sprocket 10 are formed by using the hob cutter 71. To ensure that two or more sprockets having different numbers of teeth are formed by a single hob cutter 70, the amount of addendum modification X between a hobbing pitch line PL3 (tangential to a pitch circle of the sprocket 10) and a hob center line CL (tangential to a meshing circle of the sprocket 10) is set to vary with the numbers of sprocket teeth in such a manner that the engagement height of the inside flanks 50 is in equal to the distance U from the center O of the sprocket to the centers of the connecting pins when the silent chain is wrapped around the sprocket. By thus setting the amount of addendum modification, two or more sprocket tooth forms varying with the numbers of sprocket teeth can be produced by the same hob cutter 70.

The amount of addendum modification X used in the sprocket tooth hobbing process is arithmetically determined in a manner as described below.

As can be seen from FIG. 7, a hobbing pitch circle diameter Dp of a sprocket 10 to be produced, the number of teeth x of the sprocket 10, and a center distance U from the center O of the sprocket 10 and the centers of the connecting pins when the silent chain is wrapped around the sprocket 10 have geometric relationships expressed by $$DP=P*z/\Pi$$

$$U=P/2\ \sin(\pi/z).$$

By setting the engagement height of the inside flanks (i.e, the distance between the center O of the sprocket 10 and the centers of the connecting pins when the chain is seated on the sprocket) equal to the center distance U, the amount of addendum modification X can easily be obtained.

When the distance between the chain pitch line PL1 and the inside flank pitch line PL2 is Hc, the amount of addendum modification X is expressed by X=Hc[U−Dp/2]. Since the pitch P of the hob cutter 70, which is equal to the chain pitch P of the link plates 23, is always constant, amounts of addendum modification X for all of the desired sprocket teeth forms can be automatically determined depending on the numbers of teeth of the sprockets.

By thus hobbing the sprocket tooth forms, the sprockets with different numbers of teeth are able to keep the chain pitch line PL1 of the silent chain 20 in a position spaced form the sprocket center O by the distance U as the chain approaches the sprockets while meshing with the sprocket teeth at the inside flanks thereof.

Next, fundamental operation of the silent chain power transmitting apparatus will be described in conjunction with only one of two or more sprockets with different numbers of teeth (such as the sprockets 11a, 11b, 12a, 12b, 13 shown in FIG. 10).

Figure 8:
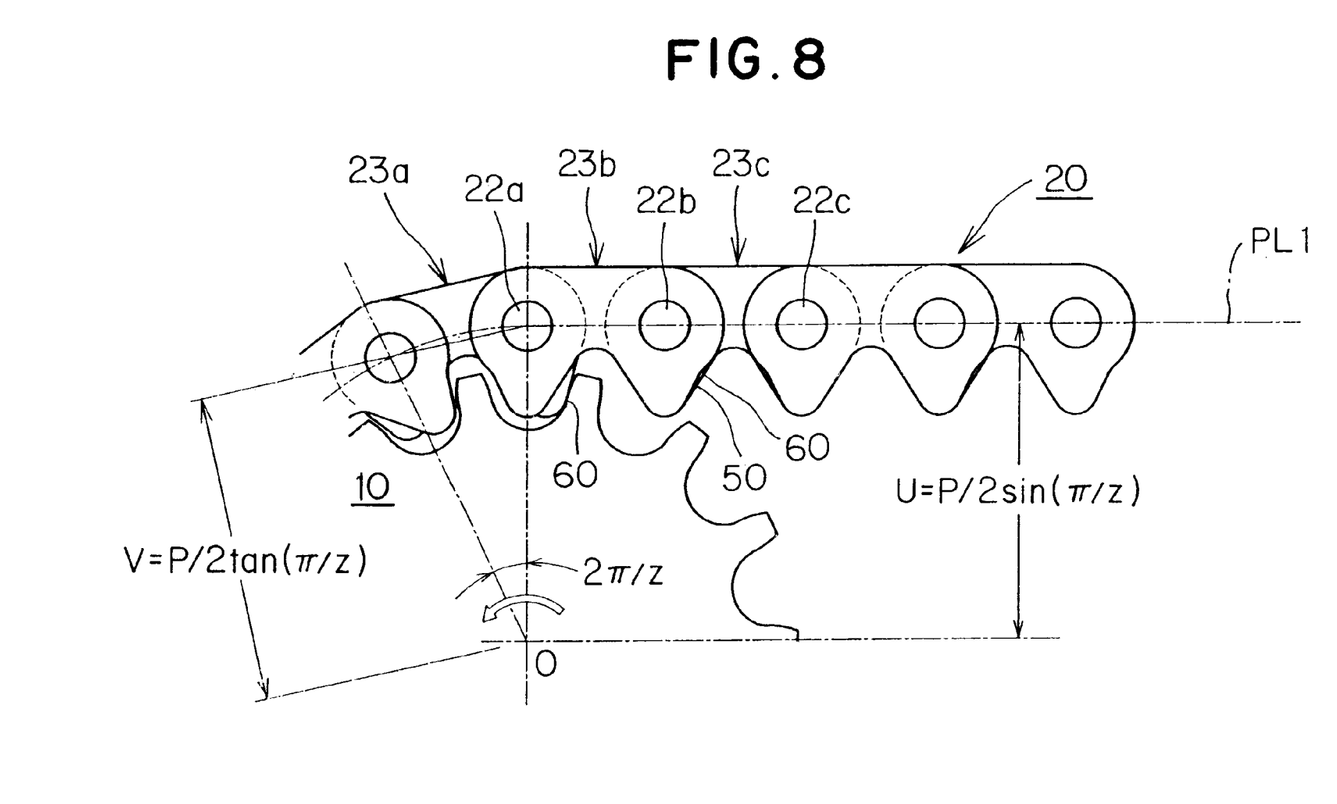
FIG. 8 schematically illustrate a meshing state of the silent chain and a sprocket of the silent chain power transmitting apparatus.

FIG. 8 shows a chain-sprocket meshing state in which the center of the sprocket 10, the connecting pin 22a and a free-span part of the chain 20 are arranged to a right angle, and the leading link plate 23a preceding to the forward end of the free-span chain part has just seated on the sprocket 10.

Since the outside flanks 60 of the link plate 23a are profiled by an envelope that is tangent to every one of a group of virtual sprocket tooth forms described on the link plate 23a while keeping the chain 20 in a position to assume the seated height of the outside flanks (which is equal to the distance from the center O of the sprocket 10 to the chain pitch line PL1) when the chain 20 is wrapped around the sprocket 10, the distance from the sprocket center O to the chain pitch line PL1 of the link plate 23a is expressed by V=P/2 tan(Π/z), and the distance from the sprocket center O to the center of the connecting pin 22a is expressed by U=P/2 sin(Π/z).

The free span chain part including the link plate 23b and succeeding ones is pulled taut linearly by chain tension, as shown in FIG. 8. At this time, the outside flanks 60 of one link plate are retracted inward from the inside flanks of the adjacent link plates. Thus, when the sprocket 10 is assumed to be a pinion, the free span chain part may be deemed a rack having teeth of trapezoidal profile formed by a multitude of inside flanks 50. In this sense, the free span chain part and the sprocket 10 have meshing relations as found in ordinary rack-and-pinion mechanisms.

Figure 9:
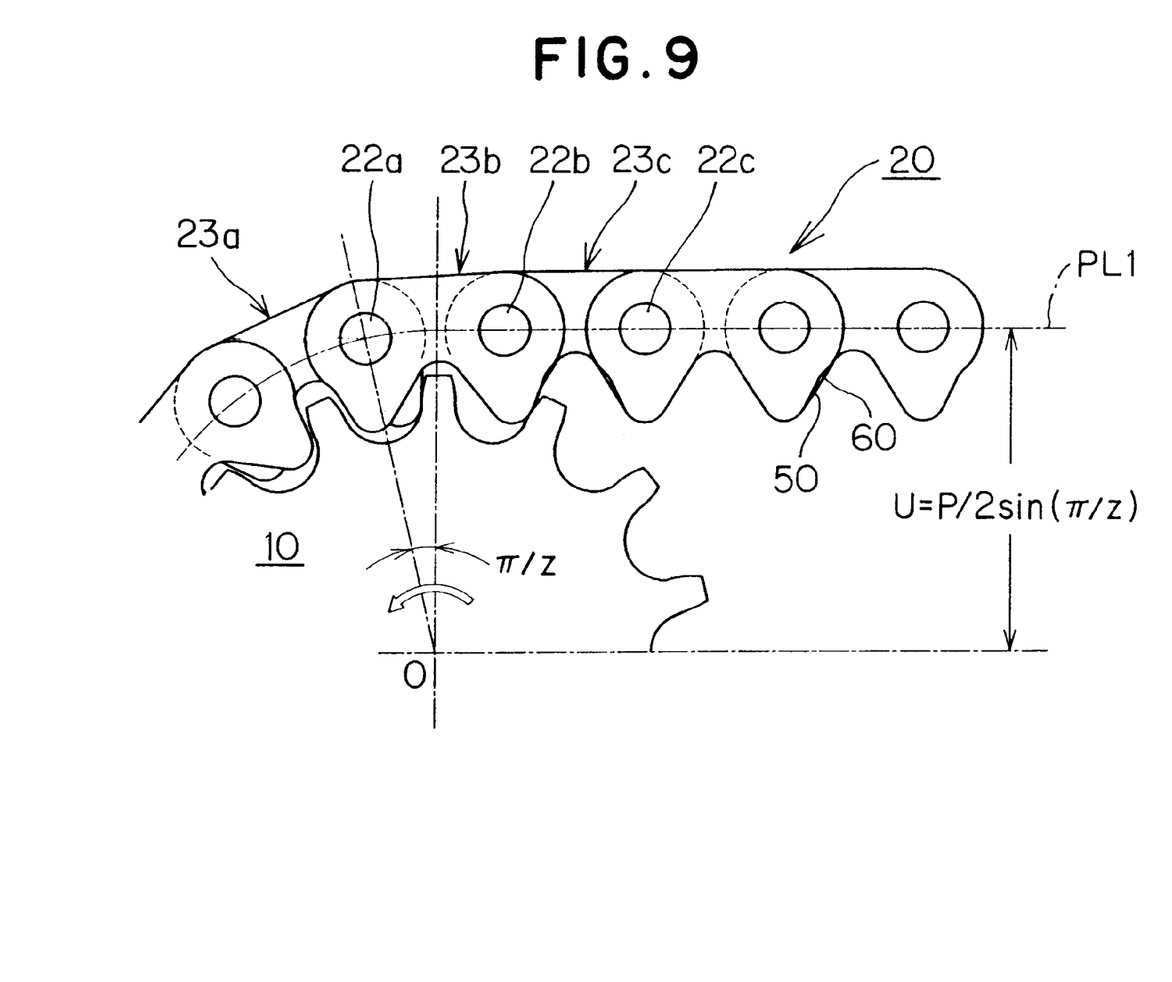
FIG. 9 schematically illustrates a meshing state in which the sprocket is rotated through a half pitch angle ($\theta/2$) from the position of FIG. 8.

Reference is made next to FIG. 9 illustrating a chain-sprocket meshing state in which the sprocket 10 is turned through half a pitch angle Π/z from the meshing state shown in FIG. 8 to advance the link plate half a chain pitch P.

In this instance, since the sprocket 10 has been hobbed with an amount of addendum modification X (FIGS. 6 and 7) set such that the engagement height of the inside flanks at the onset of the meshing engagement of the chain with the sprocket is in equal to the distance from the sprocket center O to the centers of the connecting pins, the distance from the sprocket center O to the chain pitch line PL1 of the link plate 23c is expressed by U=P/2 sin(Π/z).

The free-span chain part including the link plate 23c and succeeding ones is pulled taut linearly by chain tension, as shown in FIG. 9. At this time, the outside flanks 60 of one link plate are retracted inward from the inside flanks of the adjacent link plates. Thus, when the sprocket 10 is assumed to be a pinion, the free span chain part may be deemed a rack having teeth of trapezoidal profile formed by a multitude of inside flanks 50. In this sense, the free span chain part and the sprocket 10 have meshing relations as found in ordinary rack-and-pinion mechanisms.

After the inside flank of the link plate 23c starts to mesh with the sprocket tooth, as shown in FIG. 9, the link plate 23c is further advanced by one chain pitch until the connecting pin 22b arrives at a position where the connecting pin 22a was. During that time, the distance from the sprocket center O to the chain pitch line PL1 of the link plate 23c is kept always equal to the value U.

The link plate 23c, as it advances through the distance of one chain pitch, is caused to turn or pivot about the connecting pin 22a. With this pivotal movement of the link plate 23c, the inside flank of the link plate 23b is separated from the sprocket tooth. During that time since the outside flank 60 of the link plate 23b is still held out of contact with the sprocket tooth. This ensures that the link plate 23b moves into smooth meshing engagement with the sprocket tooth while it is supported by the connecting pins 22a and 22b.

Throughout the course of mashing actions of silent chain, the chain pitch line PL1 of the silent chain 20 approaching the sprocket in the tangential direction is always kept at a constant height U. This ensures that up and down movement of the silent chain (i.e., chordal action) caused by equilateral polygonal chain motion is suppressed.

In the silent chain power transmitting apparatus, the outside flanks of each link plate have a portion profiled by an envelope that is tangent to every one of a group of imaginary sprocket tooth form curves of sprockets with different numbers of teeth, which are described on the link plate while arranging the link plate in a position to assume the distance from the center of the sprockets to the chain pitch line when the chain is wrapped around and seated on each individual sprocket. Accordingly, even though the number of teeth of camshaft sprockets 12a, 12b (FIG. 10) is twice the number of teeth of the crankshaft sprocket 11a, and the number of teeth of the balancer shaft sprocket 13 is half the number of teeth of the balancer shaft sprocket 11b, the silent chain 20 starts to mesh with each of the sprockets with different numbers of teeth, then is wrapped around the sprocket and finally becomes seated on the sprocket while the distance between the centers O of the sprockets to the chain pitch line PL1 is kept always at a constant value which is equal to the engagement height of the inside flanks of the silent chain. This enables that the chordal action of the silent chain is suppressed with respect to all of the sprockets with different numbers of teeth.

With respect to any one of the sprockets 11a, 11b, 12a, 12b, 13 with different numbers of teeth, the distance from the sprocket center O to the chain pitch line PL1 is kept constant throughout the course of meshing of the silent chain 20 with the sprocket (i.e., from the start of meshing to the complete that the chordal action and the beating motion of the chain themselves and vibration and noises resulting from the chain's chordal action and beating motion as well can be suppressed. This leads to a stable traveling of the silent chain which is free of fluctuations of chain tension as well as improved driving performance and durability of the silent chain power transmitting apparatus.

Obviously, various minor changes and modifications of the present invention are possible in the light of the above teaching. It is therefore to be understood that within the scope of the appended claims, the present invention may be practiced otherwise than as specifically described.

What is claimed is:

1. A silent chain power transmitting apparatus comprising:
   an endless silent chain composed of a multiplicity of link plates interleaved and articulately connected together by connecting pins, each link plate having a pair of generally V-shaped link teeth and a pair of pin holes for fitting the connecting pins, the V-shaped link teeth having inside and outside flanks; and
   at least two sprockets spaced from each other and having different numbers of teeth for mesh with the V-shaped link teeth of the link plates,
wherein when the silent chain starts to mesh with each of the sprockets, the inside flank of one link plate comes in contact with a tooth of the sprocket, and as the silent chain is wrapped around and subsequently placed in full meshing with the sprocket, the outside flank of the preceding link plate comes in contact with and subsequently becomes completely seated on the same teeth of the sprocket, thereby ensuring that the silent chain transmits power between the sprockets,
wherein the sprockets each have a tooth form formed by hobbing with a hob cutter having teeth profiled similarly with the profile of a series of trapezoidal teeth formed by the inside flanks of the longitudinally overlapping link plates described previously to cut the periphery of a cylindrical workpiece with an amount of addendum modification set in such a manner that an engagement height of the inside flank at the onset of the meshing engagement between the silent chain and the sprocket is in equal to a center distance between the center of the sprocket and the center of each connecting pin when the silent chain is wrapped around and seated on the sprocket, and
wherein the outside flanks of the silent chain have a first portion profiled by an envelope that is tangent to every one of a group of tooth forms of the sprockets when the silent chain is wrapped around the sprockets with different numbers of teeth.

2. The silent chain power transmitting apparatus according to claim 1, wherein the first outer flank portion of each link tooth is disposed remotely from the tip of the link tooth, and the outside flanks further include a rectilinearly profiled second portion disposed adjacent to the tip end of each link tooth.

3. The silent chain power transmitting apparatus according to claim 2, wherein the inside flanks of each link tooth have a rectilinear profile, and the outside flank of one link plate is retracted inward from the rectilinearly profiled inside flank of the succeeding link plate.

4. The silent chain power transmitting apparatus according to claim 3, wherein the outside flanks are arcuately concaved at the junction between the first outside flank portion the rectilinearly profiled second portion.

* * * * *

UNITED STATES PATENT AND TRADEMARK OFFICE
CERTIFICATE OF CORRECTION

PATENT NO.   : 6,533,107 B2
DATED        : March 18, 2003
INVENTOR(S)  : Kenshi Suzuki et al.

It is certified that error appears in the above-identified patent and that said Letters Patent is hereby corrected as shown below:

Column 1,
Line 28, "12B" should read -- 12b --;

Column 3,
Line 40, delete "linearly";

Column 4,
Line 31, "form" should read -- from --;
Line 52, "loft" should read -- left --;

Column 5,
Line 19, "the" should read -- and the --;

Column 6,
Line 48, "lank" should read -- flank --;
Line 57, "$\beta$" should read -- $\alpha$ --;
Line 63, "50" should read -- 50 of --;

Column 7,
Line 3, "or" should read -- of --;
Line 7, "groups" should read -- group --;
Line 11, "chan" should read -- chain --;

Column 8,
Lines 25, 29 and 31, "hub" should read -- hob --;
Lines 28, 30 and 31, "$\beta$" should read -- $\alpha$ --;
Lines 29 and 33, "deddendum" should read -- dedendum --;

Column 9,
Line 20, "form" should read -- from --;

UNITED STATES PATENT AND TRADEMARK OFFICE
CERTIFICATE OF CORRECTION

PATENT NO. : 6,533,107 B2
DATED : March 18, 2003
INVENTOR(S) : Kenshi Suzuki et al.

It is certified that error appears in the above-identified patent and that said Letters Patent is hereby corrected as shown below:

<u>Column 10,</u>
Line 26, '"mashing" should read -- meshing --;
Line 59, after "complete", insert -- seating of the chain on the sprocket). This arrangement ensures --

Signed and Sealed this

Twelfth Day of August, 2003

JAMES E. ROGAN
*Director of the United States Patent and Trademark Office*